Feb. 13, 1951  R. Q. ARMINGTON ET AL  2,541,853
TRAILER LEVELING MECHANISM
3 Sheets-Sheet 1
Original Filed May 12, 1945

INVENTORS:
RAYMOND Q. ARMINGTON
GEORGE E. ARMINGTON
BY Hyde, Meyer, Baldwin & Doran
ATTORNEYS.

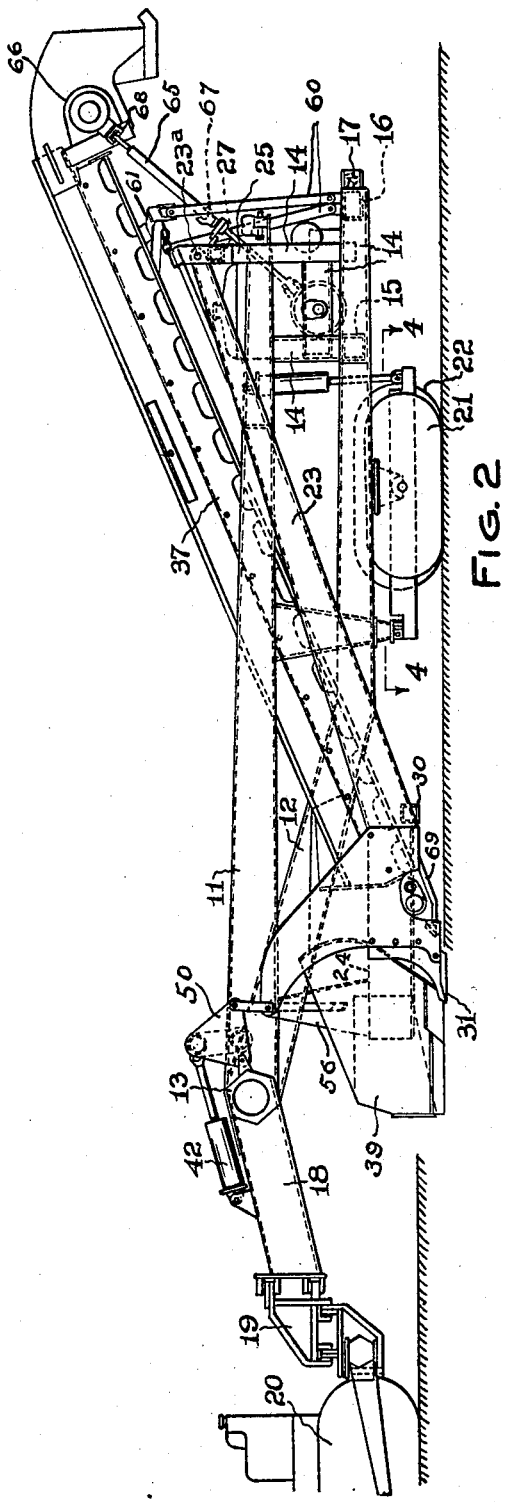
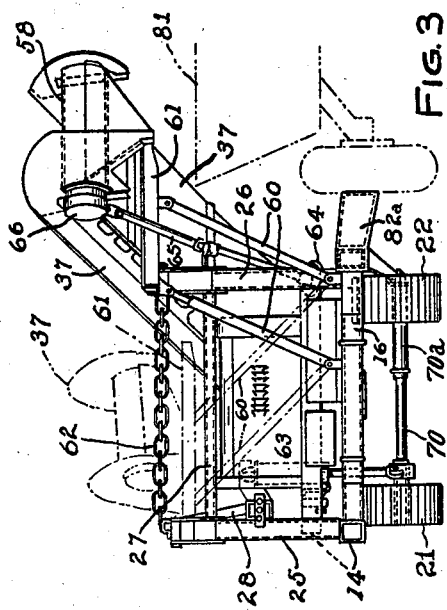
INVENTORS:
RAYMOND Q. ARMINGTON
GEORGE E. ARMINGTON
BY Hyde, Meyer, Baldwin & Doran
ATTORNEYS.

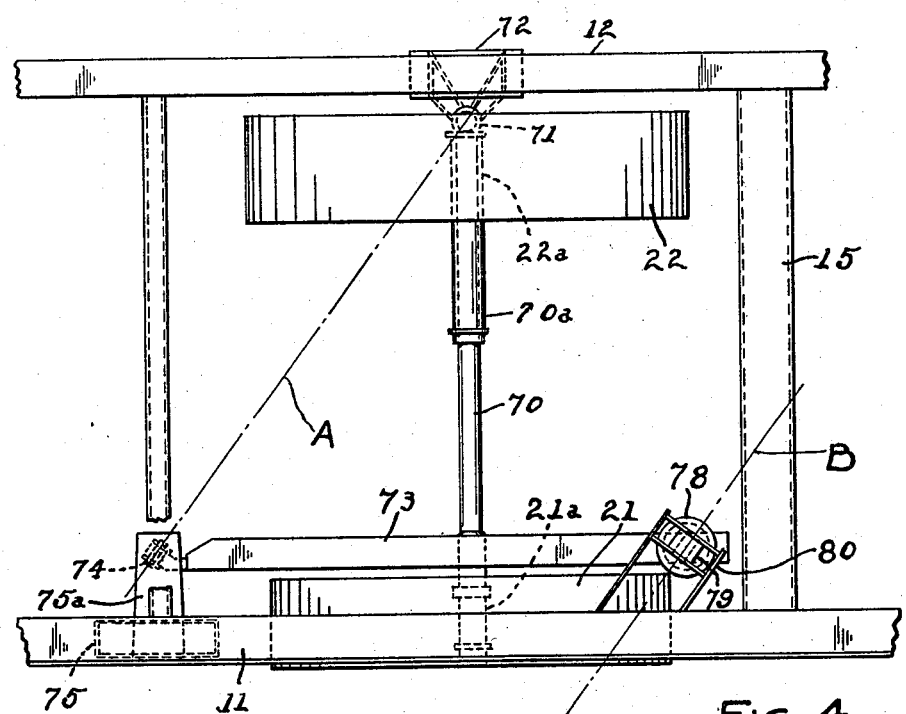
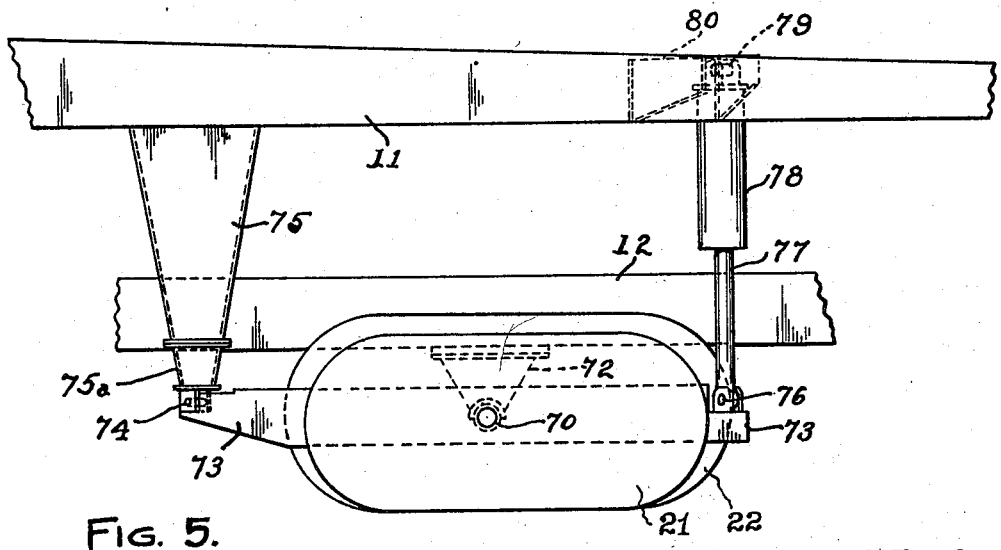

Patented Feb. 13, 1951

2,541,853

UNITED STATES PATENT OFFICE 2,541,853

TRAILER LEVELING MECHANISM

Raymond Q. Armington, Shaker Heights, and George E. Armington, South Euclid, Ohio, assignors to The Euclid Road Machinery Co., Euclid, Ohio, a corporation of Ohio Original application May 12, 1945, Serial No. 593,412. Divided and this application March 7, 1946, Serial No. 652,606

2 Claims. (Cl. 280—6)

This invention relates to improvements in apparatus for digging and loading earth or the like by means of a device traveling along the ground and cutting and loading material as it moves.

This application is a division of our copending application, Serial Number 593,412, filed May 12, 1945.

One of the objects of the present invention is the provision of apparatus of the type described having a frame and earth-cutting means so arranged that it may move into an embankment of considerable height cutting the bank away and loading the loosened material without any interference. The invention also provides a subframe for raising and lowering the cutting means with corresponding adjustment of the conveying means, all of which is arranged to cut into a high embankment as above described.

Another object of the present invention is to improve the wheel means for supporting the apparatus for travel along the ground including a novel mounting of the wheel means for adjustment to various positions on ground surfaces which are not level.

In the drawings,

Fig. 2 is a side elevational view of the device of Fig. 1;

Fig. 3 is an end view of the same showing a portion of a hauling vehicle in dot-dash lines;

Fig. 4 is a fragmental sectional view taken along the line 4—4 of Fig. 2;

Fig. 5 is a fragmental elevational view taken approximately from the line 5—5 of Fig. 1;

Figure 1:
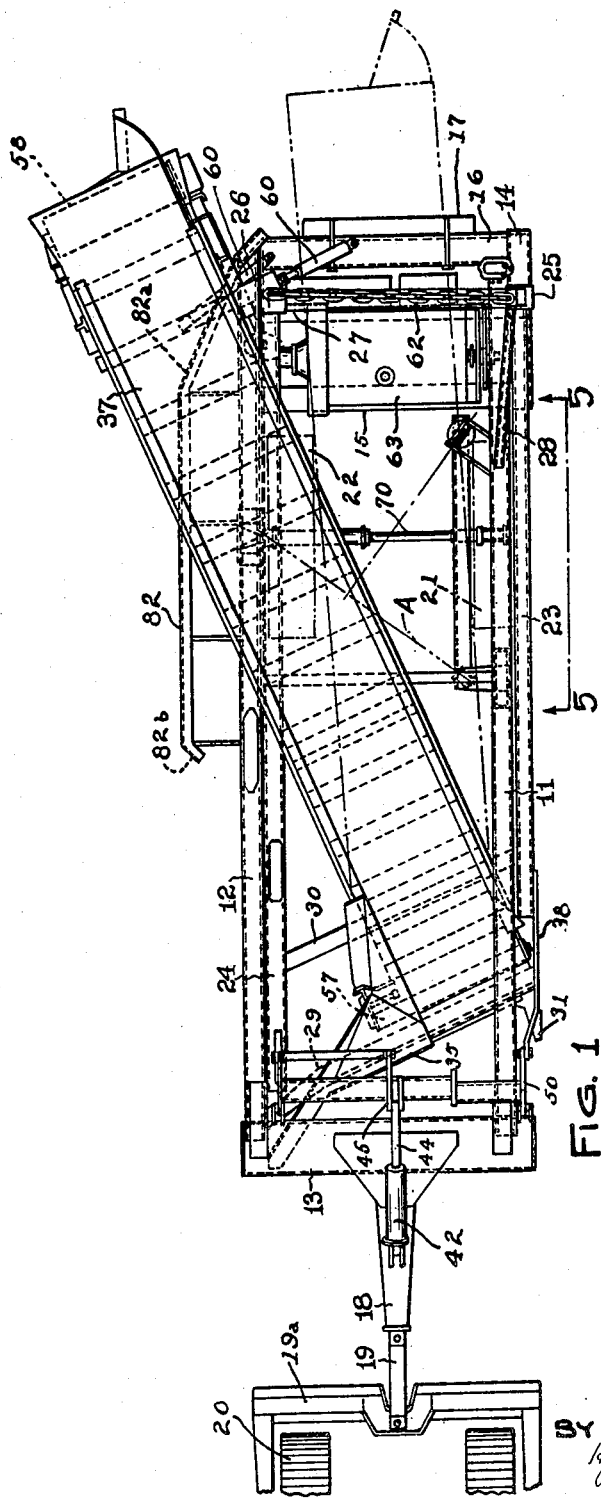
Fig. 1 is a top plan view of one embodiment of our device showing a second position of the conveyor in dot-dash lines.

Our invention provides a device of exceptional size and capacity adapted to travel along the ground and to dig and load the material over which the device travels at the rate of half a ton to a ton every second. In the drawings, we have shown a device of the trailer type supported at its forward end solely by a hitch mounting on a tractor device and supported near its rear end by wheel means later described. It should be understood, however, that certain features of our invention are applicable to a device of this type whatever the mounting for travel along the ground may be. In other words, certain features of our invention are equally applicable whether the forward wheel means is on the tractor or trailer portion of the entire apparatus.

The digging and loading device comprises a main frame having side frame members 11 and 12, each generally parallel to the path of travel of the apparatus. These side beams are preferably of hollow box construction, and each of them may be formed of a pair of channel-shape sections having their flanges facing each other and welded together. The two side beams are rigidly joined together at the front end of the device by a hollow box beam 13 generally hexagonal in section as clearly seen in Fig. 2. At the rear end a subframe numbered 14 extends downwardly from beam 11 to connect rigidly with cross-beams 15 and 16 which in turn are connected to the rear end of the side-beam 12. A bumper block 17 is secured to the rear face of the cross-beam 16 for use if a pusher tractor is used. Extending forwardly from the mid-portion of beam 13 is the drawbar 18 which is connected by hitch 19 to a tractor vehicle 20. This hitch connection is fully described and claimed in the copending application of Mayner and Kapel, Serial Number 513,702, filed December 10, 1943, now Patent No. 2,488,676 granted November 22, 1949, to which reference may be had for further details. The only other support for the apparatus is the wheel means indicated at 21 and 22 to the rear of the center of the digging and loading apparatus and which will be described in greater detail later.

The digging and loading devices are carried on a subframe which is mounted on the main frame above described in a manner to permit the vertical adjustment of the cutting devices. This subframe comprises a pair of compression strut push beams 23 and 24, each oscillating in a vertical plane parallel to, and to the left of, beams 11 and 12 respectively when looking toward the front of the apparatus. Each of these push beams is of box-beam construction, the beam having a greater vertical depth toward the front of the machine and tapering rearwardly and upwardly. The push beam 23 has a pivotal mounting at 23a on the vertical rear post 25 which is in alinement with one of the frame beams 14. The push beam 24 has a pivotal mounting in alinement with 23a on the vertical rear post 26. A cross beam 27 rigidly connected between posts 25 and 26 above the level of beam 11 ties the rear posts together. Each of these posts has a diagonal brace extending from the top of post 25 or 26 diagonally downward to the adjacent side beam member of the main frame as shown clearly in Fig. 1 by brace 28. At their forward ends the push beams 23 and 24 are rigidly connected together by the diagonally extending cross beam 29, generally triangular in section, and by the diagonally extending beam 30, of generally square section.

The digging devices are mounted at the front lower ends of the push beams 23 and 24. Cutting means is provided in a generally horizontal plane and arranged concave in a forward direction with a plow point 31 in the forwardmost point at the left side of the apparatus and a hardened point 32 at the forwardmost point on the right-hand side of the cutting devices. A cutting blade 33 extends inwardly and rearwardly from the point 32 at an angle of approximately thirty-six degrees with the center line of the apparatus. At the point 34 the cutting blade turns toward the center of the vehicle through an angle of approximately thirty degrees, and the blade 35 then extends at an angle of approximately sixty-six degrees with respect to the center line of the apparatus over to the point 36 adjacent the conveyor 37. The cutting blade 37' extends across in front of the conveyor and is approximately in line with the blade 35 although preferably it is set back slightly.

Suitable mold board means is provided to direct all dirt between the points 31 and 32 on to the conveyor 37 which is arranged to receive this dirt from the rearmost portion of the generally concavely arranged cutting blades.

As shown in the above mentioned copending application, means is provided for raising and lowering the earth cutting devices above described, a conveyor 37 is positioned diagonally of the frame and extends from the forward portion of the device upwardly, rearwardly, and toward the right, for discharging material from the top of the conveyor so as to fall directly into a hauling wagon or the like traveling in a path parallel to the cutting and loading device. Also suitable driving means is provided for the conveyor as described in the above mentioned copending application.

The wheel means shown for supporting the main load of the entire trailer apparatus comprises the parallel endless crawler tracks 21 and 22 previously mentioned although it will be understood that ordinary wheels might be used at this point if desired. The reason we have shown the crawler tracks is that they give a greater bearing surface and permit the device to travel over soft ground without sinking in. We provide novel means for mounting these crawler tracks on an undercarriage together with means for tilting the loader relative to this undercarriage which makes it possible to control the grade cut by the digging and scraping means. To this end the tracks are provided with central supporting trunnions 21a and 22a respectively which are connected by means not shown with the frame portion of the crawler tracks. A type of track suitable for use here is disclosed in the copending application of Stewart F. Armington, Serial Number 493,555, filed July 5, 1943, now Patent No. 2,411,408 granted November 19, 1946, and the trunnions 21a, 22a above described correspond to sleeve 24 in said copending application. These trunnions are mounted on a suitable undercarriage which here comprises a common shaft 70 which is preferably provided with a telescoping joint which is shown at 70a to permit slight elongation and contraction as is necessary during the adjustments about to be described. One end of this shaft is mounted in the ball-and-socket joint 71 supported from the bracket 72 which is mounted on the main frame member 12. This permits oscillation of the shaft 70 about a substantially horizontal axis in a vertical plane and permits slight oscillation of the shaft in a fore-and-aft direction also. Near its other end the shaft 70 is provided with a bearing in a lever 73 intermediate the ends of the lever. This lever is pivoted for oscillation about a substantially horizontal axis at its forward end on the pivot pin 74 which is supported on bracket 75 which is rigid with and extends downwardly from the main frame member 11. This bracket at its lower end has a portion 75a extending laterally inwardly to give the proper position of pivot 74. The other end of the lever or beam 73 is pivotally connected at 76 with the piston rod 77 of the hydraulic jack 78 which in turn has a trunnion mounting at 79 on a bracket 80 which is connected with side frame member 11. It will be noted from examination of Figs. 1 and 4 that the pivot pin 74 is on a line A, which when extended passes through the ball-and-socket joint 71. The pivot pin 76 lies along the line B which is parallel to the line A. This reduces to a minimum any friction which might occur when the hydraulic jack 78 is actuated by means (not shown) to raise and lower the piston rod 77 so as to vary the angularity of shaft 70 with respect to the upper portion of the loader. By this means the crawler tracks 21 and 22 always rest flat upon the ground and the superstructure of the loader may be tilted relative thereto.

What we claim is:

1. In a device adapted to dig and load earth by travel along a path, a frame, parallel spaced wheel means supporting said frame for movement along the ground, a common shaft for said wheel means, said shaft having axially aligned telescoping parts intermediate its ends, one end of said shaft having a fixed pivotal mounting on said frame permitting shaft oscillation about a substantially horizontal axis in a vertical plane, a lever having a pivotal mounting on said frame for lever oscillation about a substantially horizontal axis and supporting said shaft at a point spaced from both of said pivotal mountings, and means for holding said lever in various positions relative to said frame.

2. A device as in claim 1 wherein said fixed pivotal mounting for said one end of said shaft comprises a ball and socket joint, and wherein said pivotal mounting for said lever comprises an axis of oscillation which, when extended, passes through said ball and socket joint.

RAYMOND Q. ARMINGTON.
GEORGE E. ARMINGTON.

REFERENCES CITED

The following references are of record in the file of this patent:

UNITED STATES PATENTS

| Number | Name | Date |
|---|---|---|
| 826,548 | Dill et al. | July 24, 1906 |
| 1,150,588 | Fell | Aug. 17, 1915 |
| 2,148,504 | Richter | Feb. 28, 1939 |
| 2,324,587 | Krogh | July 20, 1943 |
| 2,387,249 | Eddington | Oct. 23, 1945 |